(12) United States Patent
Lin

(10) Patent No.: US 10,651,600 B1
(45) Date of Patent: May 12, 2020

(54) CARD HOLDER

(71) Applicant: Cheng Uei Precision Industry Co., Ltd., New Taipei (TW)

(72) Inventor: Chih-Chiang Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/506,920

(22) Filed: Jul. 9, 2019

(30) Foreign Application Priority Data

Jan. 2, 2019 (CN) ..................... 2019 2 0011856 U

(51) Int. Cl.
*H05K 1/14* (2006.01)
*H01R 13/635* (2006.01)
*H01R 12/71* (2011.01)

(52) U.S. Cl.
CPC .......... *H01R 13/635* (2013.01); *H01R 12/712* (2013.01)

(58) Field of Classification Search
CPC ............................ G06K 7/0021; H04B 1/3818
USPC ............................ 439/483; 361/737; 235/492
See application file for complete search history.

(56) References Cited

U.S. PATENT DOCUMENTS

| | | | | |
|---|---|---|---|---|
| 5,699,406 A * | 12/1997 | Liikanen | ............... | G06K 7/0021 379/357.01 |
| 7,494,353 B2 * | 2/2009 | Choi | ..................... | G06K 13/08 439/159 |
| 7,865,210 B2 * | 1/2011 | Wang | .................... | H05K 7/1405 455/550.1 |
| 7,866,996 B2 * | 1/2011 | Achsaf | ................. | H05K 5/0278 439/159 |
| 8,092,257 B2 * | 1/2012 | Hubert | ................. | H05K 5/0282 361/737 |
| 8,270,175 B2 * | 9/2012 | Duan | .................... | H04B 1/3816 361/737 |
| 8,403,226 B2 * | 3/2013 | Wang | .................... | G06K 7/0021 235/451 |
| 8,462,514 B2 * | 6/2013 | Myers | ................. | H04M 1/0274 361/754 |
| 8,614,897 B2 * | 12/2013 | Tang | ...................... | G06K 13/08 361/752 |
| 8,654,535 B2 * | 2/2014 | Lin | ................... | G06K 19/07741 361/737 |
| 8,672,229 B2 * | 3/2014 | Pesonen | ............... | H04B 1/3816 235/486 |
| 8,976,521 B2 * | 3/2015 | Liu | ....................... | G06K 7/0021 361/679.38 |

(Continued)

*Primary Examiner* — Neil Abrams
(74) *Attorney, Agent, or Firm* — Cheng-Ju Chiang

(57) ABSTRACT

A card holder includes a shell, a base unit, a button unit and a pushing unit. The shell opens an opening. A bottom of the shell is opened freely to form an accommodating space communicated with the opening. The base unit is detachably assembled in the shell. The base unit has an insertion end, a pushing end disposed opposite to the insertion end, and a connecting portion connected between the insertion end and the pushing end. A top of a middle of the insertion end is recessed downward to form a receiving groove for cooperating with a SIM card. The insertion end is detachably inserted into the accommodating space through the opening. The button unit is movably mounted to the pushing end. The pushing unit is disposed between the base unit and the button unit.

19 Claims, 15 Drawing Sheets

(56) References Cited

U.S. PATENT DOCUMENTS

| | | | | |
|---|---|---|---|---|
| 9,106,310 B2* | 8/2015 | Dondzik | .............. | H04B 1/3888 |
| 9,214,772 B2* | 12/2015 | Liu | ...................... | H01R 12/721 |
| 9,396,365 B2* | 7/2016 | Hood, III | ............. | G06K 7/0069 |
| 9,445,521 B2* | 9/2016 | Tan | ...................... | G06K 7/0021 |
| 9,456,516 B2* | 9/2016 | Heiskanen | ............... | H05K 7/14 |
| 9,484,655 B2* | 11/2016 | Matsunaga | ............ | H01R 13/15 |
| 9,558,380 B2* | 1/2017 | Okoshi | ................ | G06K 7/0021 |
| 9,658,641 B2* | 5/2017 | Stephens | .................. | H04B 1/38 |
| 9,875,432 B2* | 1/2018 | Motohashi | ........... | G06K 7/0021 |
| 9,893,753 B2* | 2/2018 | Jiang | ................... | H04B 1/3816 |
| 9,954,328 B2* | 4/2018 | Motohashi | ............. | H01R 27/00 |
| 10,043,114 B2* | 8/2018 | Hyeon | ................ | G06K 13/0831 |
| 10,062,985 B2* | 8/2018 | Cheng | .................. | H04B 1/3816 |
| 10,211,869 B2* | 2/2019 | Chen | ................... | H04B 1/3816 |
| 10,271,447 B2* | 4/2019 | Choi | ................... | H04B 1/3818 |
| 10,284,246 B2* | 5/2019 | Li | ........................... | H05K 7/12 |

* cited by examiner

CARD HOLDER

CROSS-REFERENCE TO RELATED APPLICATION

The present application is based on, and claims priority form, China Patent Application No. 201920011856.7, filed Jan. 2, 2019, the disclosure of which is hereby incorporated by reference herein in its entirety.

BACKGROUND OF THE INVENTION

1. Field of the Invention

The present invention generally relates to a card holder, and more particularly to a card holder for receiving a subscriber identity module (SIM) card therein, and having a lower request for manufacturing tolerances and facilitating being assembled, and ensuring that a SIM card function and a button function are in normal operations.

2. The Related Art

Following the development of intelligences of mobile phones, requirements for subscriber identity module (SIM) card connectors are gradually increased, whereas SIM cards of the mobile phones are upgraded to make card holders for receiving the SIM cards continuously renewed. In order to add memories of the mobile phones, enlarge batteries and make a main plate which has a more dense arrangement release a space, miniature SIM cards have become products facilitating producing lighter products of enterprises, so that the card holders for receiving the SIM cards have become target products which the enterprises are eager to achieve.

A conventional card holder for receiving the SIM card therein of the mobile phone is separated from a volume button, and the conventional card holder occupies a certain space, based on people's requirements, a design of combining the conventional card holder with the volume button is emerged, thereby an occupying space of the mobile phone will be reduced. When the conventional card holder is used as the volume button, a position deviation between the conventional card holder, and a card connector to which the conventional card holder is assembled, will be generated in a process of assembling the conventional card holder with the card connector on affection of manufacturing tolerances. In practice, when the conventional card holder is assembled to the card connector, though the conventional card holder is pushed fully into the card connector, a phenomenon of the miniature SIM card being still without contacting the card connector or the miniature SIM card being even without being pushed fully is caused.

However, the miniature SIM card has been connected with the card connector, on the contrary, a button function of the conventional card holder which is used as the volume button is in an abnormal operation.

SUMMARY OF THE INVENTION

An object of the present invention is to provide a card holder for receiving a subscriber identity module (SIM) card. The card holder includes a shell, a base unit, a button unit and a pushing unit. The shell opens an opening penetrating through a rear end of the shell. A bottom of the shell is opened freely to form an accommodating space communicated with the opening. The base unit is detachably assembled in the shell. The base unit has an insertion end, a pushing end disposed opposite to the insertion end, and a connecting portion connected between the insertion end and the pushing end. A top of a middle of the insertion end is recessed downward to form a receiving groove for cooperating with the SIM card. The SIM card is received in the receiving groove. The insertion end is detachably inserted into the accommodating space through the opening. The button unit is movably mounted to and connected with the pushing end of the base unit. The pushing unit is disposed between the base unit and the button unit. The pushing unit is capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit.

Another object of the present invention is to provide a card holder for receiving a subscriber identity module (SIM) card. The card holder includes a shell, a base unit, a button unit and a pushing unit. The shell opens an opening penetrating through a rear end of the shell. A bottom of the shell is opened freely to form an accommodating space communicated with the opening. The base unit is detachably assembled in the shell. The base unit has an insertion end, a pushing end disposed opposite to the insertion end, a connecting portion connected between the insertion end and the pushing end, and a receiving groove disposed in the insertion end. The SIM card is received in the receiving groove. The insertion end is detachably inserted into the accommodating space through the opening. The button unit is movably mounted to the pushing end of the base unit. The pushing unit is disposed between the base unit and the button unit. The pushing unit is capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit. The two opposite ends of the pushing portion extend oppositely to form a first button and a second button for realizing button functions, respectively.

Another object of the present invention is to provide a card holder for receiving a subscriber identity module (SIM) card. The card holder includes a shell, a base unit, a button unit and a pushing unit. The shell opens an opening penetrating through a rear end of the shell. A bottom of the shell is opened to form an accommodating space communicated with the opening. The base unit is detachably assembled in the shell. The base unit has an insertion end, a pushing end disposed opposite to the insertion end, a connecting portion connected between the insertion end and the pushing end, and a receiving groove disposed in the insertion end. The SIM card is received in the receiving groove. The insertion end is detachably inserted into the accommodating space through the opening. The button unit is movably mounted to the pushing end of the base unit. The pushing unit is disposed between the base unit and the button unit. The pushing unit includes a limiting pillar pivotally connected with the button unit, and an elastic element disposed to the button unit and contacting with the limiting pillar. A rear edge of a top plate of the shell is recessed frontward to form an inclined sliding groove communicated with the opening and the accommodating space. The limiting pillar is inclined in the inclined sliding groove. The pushing unit is capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit.

As described above, the card holder is connected with the SIM card by virtue of the pushing unit selectively pushing against the base unit, and a function of the button unit is in normal, requirements for the manufacturing tolerances of the card holder are lowered, and functions of the SIM card, the first button and the second button are ensured to be in normal, the first button and the second button are flexibly pressed through a modular design of at least one fixing hole and at least one rivet, so the functions of the SIM card, the first button and the second button are combined and an occupying space of the card holder in a mobile phone is decreased.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
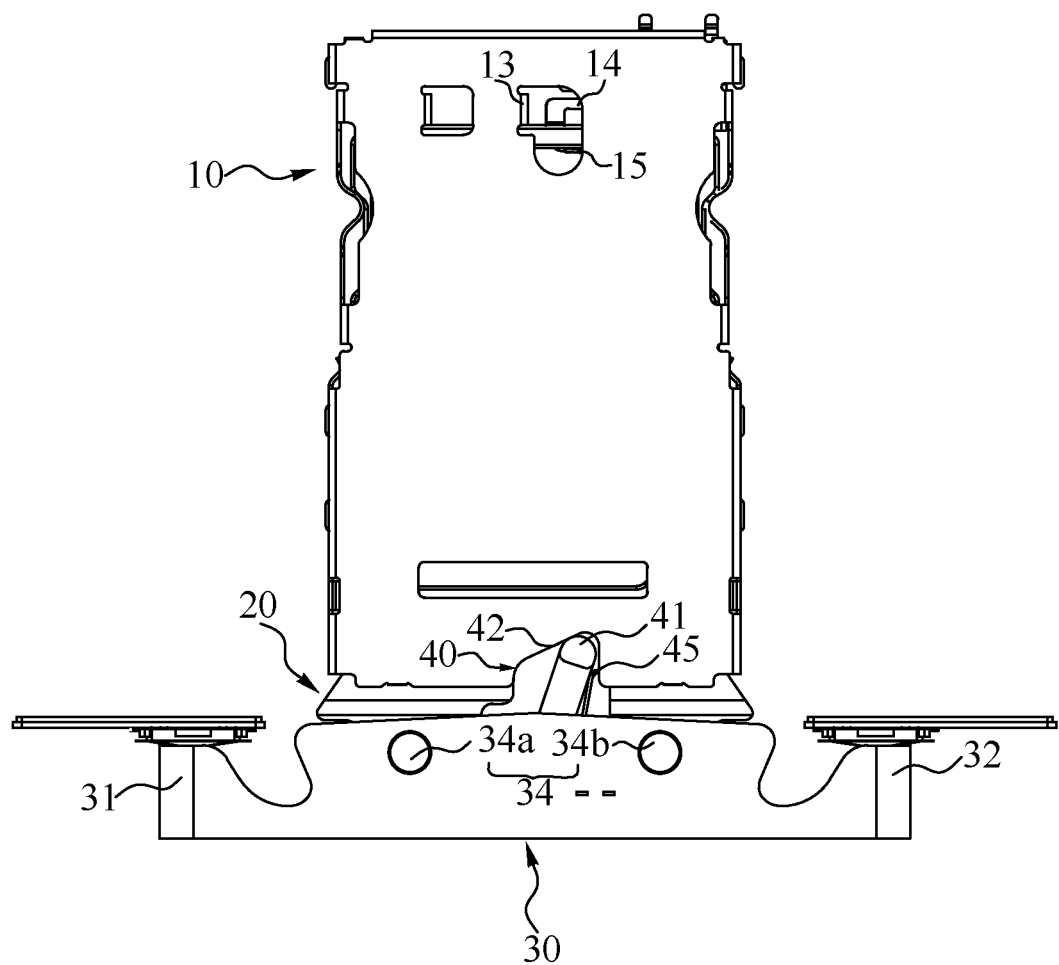
FIG. 1 is a front view of a card holder for receiving a SIM card therein in accordance with the present invention.
Figure 8:
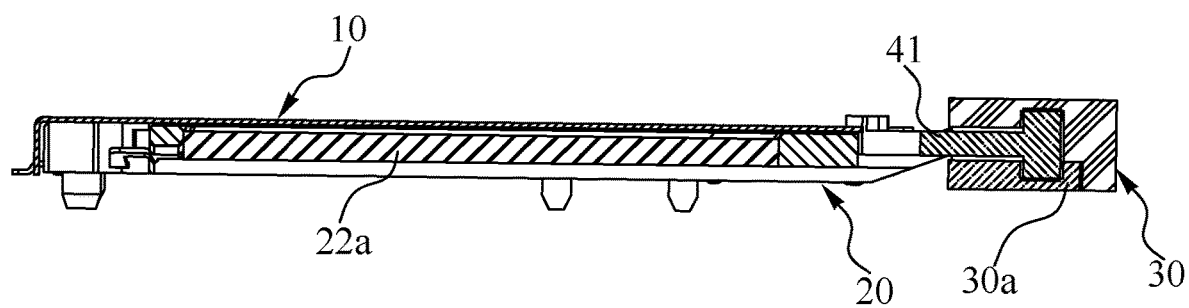
FIG. 8 is a sectional diagrammatic drawing showing the card holder of FIG. 1.

With reference to FIG. 1 and FIG. 8, a card holder 100 in accordance with a preferred embodiment of the present invention is shown. The card holder 100 is used for receiving a subscriber identity module (SIM) card 22a therein. The card holder 100 includes a shell 10, a base unit 20 detachably assembled in the shell 10, and a button unit 30.

With reference to FIG. 1 to FIG. 8, the shell 10 opens an opening 11 penetrating through a rear end of the shell 10. A bottom of the shell 10 is opened freely to form an accommodating space 12 communicated with the opening 11. The base unit 20 has an insertion end 21 located at a front of the base unit 20, a pushing end 23 disposed opposite to the insertion end 21, a connecting portion 24 connected between the insertion end 21 and the pushing end 23, and a receiving groove 22 disposed in the insertion end 21 for cooperating with and receiving the SIM card 22a therein. The SIM card 22a is received in the receiving groove 22. A top of a middle of the insertion end 21 is recessed downward to form the receiving groove 22. A middle of a bottom wall of the receiving groove 22 opens a penetrating groove 221. Fronts of two opposite sides of the insertion end 21 are recessed inward to form two locking grooves 222. Two facing inner surfaces of each locking groove 222 are oppositely inclined outward to form two guiding surfaces 223. The insertion end 21 is detachably inserted into the accommodating space 12 through the opening 11. A middle of a rear surface of the pushing end 23 is recessed frontward to form a lacking groove 44. One side of a front wall of the lacking groove 44 is recessed frontward to form an avoiding space 43. The avoiding space 43 is connected with and communicated with the lacking groove 44. The pushing end 23 includes two pushing pieces 231 connected with two opposite sides of a rear of the connecting portion 24.

The shell 10 has a rectangular top plate 101, and two lateral plates 102 protruded downward from two opposite sides of the top plate 101. The accommodating space 12 is surrounded among the top plate 101 and the two lateral plates 102. Fronts of the two lateral plates 102 are arched towards each other to form two locking portions 103. A middle of a rear edge of the top plate 101 of the shell 10 is recessed frontward to form an inclined sliding groove 42. One side of the inclined sliding groove 42 adjacent to the lacking groove 44 is shallower, and the other side of the inclined sliding groove 42 adjacent to the avoiding space 43 is deeper. The inclined sliding groove 42 is communicated with the opening 11 and the accommodating space 12. An inner surface of a front wall of the inclined sliding groove 42 slantwise extends frontward, so an inner surface of one side wall of the inclined sliding groove 42 parallel with the two lateral plates 102 of the shell 10 is shorter than an inner surface of the other side wall of the inclined sliding groove 42 which is opposite to the one side wall of the inclined sliding groove 42. The inner surfaces of the front wall and the two side walls of the inclined sliding groove 42 form a moving track R. A junction between the inner surface of the front wall of the inclined sliding groove 42 and the inner surface of the other side wall of the inclined sliding groove 42 is slantwise arched frontward away from the one side wall of the inclined sliding groove 42 and is shown as an arc shape.

With reference to FIG. 2 to FIG. 8, the card holder 100 further includes a pushing unit 40 disposed between the base unit 20 and the button unit 30. The button unit 30 is movably mounted to and connected with the pushing end 23 of the base unit 20. The pushing unit 40 is capable of being alternatively in a first status of pushing against the base unit 20 (shown in FIG. 7 and FIG. 8) and in a second status of stopping pushing against the base unit 20 (shown in FIG. 9 and FIG. 10), so that the pushing unit 40 is switched from the first status of pushing against the base unit 20 to the second status of stopping pushing against the base unit 20, on the contrary, the pushing unit 40 is switched from the second status of stopping pushing against the base unit 20 to the first status of pushing against the base unit 20.

The pushing unit 40 includes a limiting pillar 41 and an elastic element 45. A rear end of the limiting pillar 41 is connected with a pivoting column 41a. A top surface and a bottom surface of the pivoting column 41a project beyond a top surface and a bottom surface of the limiting pillar 41, respectively. A top of a front end of the limiting pillar 41 protrudes upward to form a blocking portion 411. The blocking portion 411 is blocked in the inclined sliding groove 42. The elastic element 45 is of a substantially L shape. The elastic element 45 has a substantially L-shaped fixing portion 451. Two portions of a top of a rear end of the fixing portion 451 disposed horizontally protrude upward to form two insertion pieces 452 spaced from each other. A front end of the fixing portion 451 is gradually inclined frontward and sideward, and is located in front of the rear end of the fixing portion 451. A tail end of the fixing portion 451 is bent sideward to form an abutting portion 453 opposite to the rear end of the fixing portion 451.

Referring to FIG. 1 to FIG. 5, in the preferred embodiment, the limiting pillar 41 is pivotally connected with the button unit 30. When the limiting pillar 41 slides along the moving track R and in the inclined sliding groove 42, the limiting pillar 41 is inclined in the inclined sliding groove 42 to make a front end of the limiting pillar 41 slide into the arc-shaped junction between the inner surface of the front wall of the inclined sliding groove 42 and the inner surface of the other side wall of the inclined sliding groove 42. The front end of the limiting pillar 41 which is inclined under an action of the inclined sliding groove 42 is accommodated in the avoiding space 43. An inner wall of the lacking groove 44 bears a pushing force of the limiting pillar 41.

Referring to FIG. 1 to FIG. 7, in the preferred embodiment, the pushing unit 40 is directly assembled to the button unit 30. The elastic element 45 is disposed to the button unit 30 and contacts with the limiting pillar 41. One end of the elastic element 45 is fixed in the button unit 30. The button unit 30 includes a pushing portion 35, and a fastening board 30a covered under the pushing portion 35. One side of a bottom surface of the pushing portion 35 is recessed upward to form a holding groove 351. A middle of the bottom surface of the pushing portion 35 is recessed upward to form a limiting groove 354. The limiting groove 354 is connected with and communicated with the holding groove 351. A rear end of an inner surface of a top wall of the limiting groove 354 is further recessed upward to form a circular rotation groove 355. A top of the pushing portion 35 opens at least one fastening hole 357 communicated with the holding groove 351. Two opposite sides of the top of the pushing portion 35 open two fastening holes 357. A portion of a rear wall of the holding groove 351 protrudes frontward to form an isolation block 356 isolated between a rear end of the rotation groove 355 and a rear end of the holding groove 351. An inner surface of a top wall of the holding groove 351 protrudes downward to form a T-shaped buckling block 352 projecting into the holding groove 351. The buckling block 352 is spaced from the isolation block 356 and the rear wall of the holding groove 351. Two sides of a portion of the top wall of the holding groove 351 between the isolation block 356 and the rear wall of the holding groove 351 open two insertion slots 353.

The elastic element 45 is disposed to the fastening board 30a and is fastened in the button unit 30. A middle of the fastening board 30a opens a circular pivoting hole 30b. The fastening board 30a opens at least one locating hole 454. Two opposite sides of the fastening board 30a open two locating holes 454. The pivoting hole 30b is located between the two locating holes 454. A top end of the pivoting column 41a is rotatably disposed in the rotation groove 355. A bottom end of the pivoting column 41a is rotatably limited in the pivoting hole 30b. So the limiting pillar 41 is capable of rotating along the inner surface of the top wall of the limiting groove 354. A bottom end of the pivoting column 41a rotates along the pivoting hole 30b. The elastic element 45 is fastened to the pushing portion 35. The elastic element 45 is fastened in the holding groove 351. The fixing portion 451 is fixed in the holding groove 351. The fixing portion 451 is fixed among the buckling block 352, the isolation block 356 and the rear wall of the holding groove 351. The two insertion pieces 452 are inserted into the two insertion slots 353, respectively. The abutting portion 453 abuts against the front end of the limiting pillar 41.

Referring to FIG. 1 to FIG. 10, the pushing unit 40 is set to the first status of pushing against the base unit 20, at the moment, the bottom end of the pivoting column 41a of the limiting pillar 41 rotates in the pivoting hole 30b to make the limiting pillar 41 deflected towards a direction opposite to the direction A under an action of the elastic element 45 abutting against the limiting pillar 41, so that the limiting pillar 41 abuts against a front wall of the lacking groove 44. When a user keeps pushing against the button unit 30 to move towards a direction B, the lacking groove 44 gradually approaches the inclined sliding groove 42, so that a front end of the limiting pillar 41 contacts an inner surface of a junction between the front wall and the one side wall of the inclined sliding groove 42.

With reference to FIG. 1 to FIG. 11, when the user keeps pushing the button unit 30 to move towards the direction B, the limiting pillar 41 is gradually deflected towards the direction A under the action of the inclined sliding groove 42, at the moment, the elastic element 45 is gradually inclined towards the direction A under an action of the limiting pillar 41 being inclined towards direction A and pushing against the elastic element 45. So a distance between the base unit 20 and the button unit 30 start being gradually shortened.

Referring to FIG. 1 to FIG. 12, when the base unit 20 has fully entered a preset position disposed in the button unit 30, the user still keeps pushing against the button unit 30 to move towards the direction B, the limiting pillar 41 is inclined towards the direction A under the action of the inclined sliding groove 42 to make the limiting pillar 41 completely break away from lacking groove 44 to enter the avoiding space 43, at the moment, the two locking portions 103 are locked in the two locking grooves 222. The first status of pushing against the base unit 20 is completed by an isolation of the inclined sliding groove 42 to enter the second status of stopping pushing against the base unit 20, so even though the button unit 30 is further pushed frontward, a position of the base unit 20 will be without being affected, and then manufacturing tolerances of the card holder 100 are avoided being achieved, consequently, a phenomenon of the SIM card 22a being affected to fail in contacting the card holder 100 to which the card holder 100 is assembled is caused or a phenomenon of the button unit 30 being in an abnormal function is caused.

Referring to FIG. 5, FIG. 8, FIG. 9, FIG. 12 and FIG. 13, in the preferred embodiment, in order to provide a convenience for the user to pull out the SIM card 22a in bare hands, when the user stops pushing the button unit 30 towards the direction B, the elastic element 45 elastically abuts against the limiting pillar 41 to make the limiting pillar 41 slightly deflected towards the direction opposite to the direction A, at the moment, the distance between the base unit 20 and the button unit 30 starts being gradually lengthened to make the button unit 30 slightly project a surface of a mobile phone 400 to which the card holder 100 are assembled so as to provide the convenience for the user to pull out the SIM card 22a in the bare hands. The mobile phone 400 includes two approaching portions 401.

Figure 2:
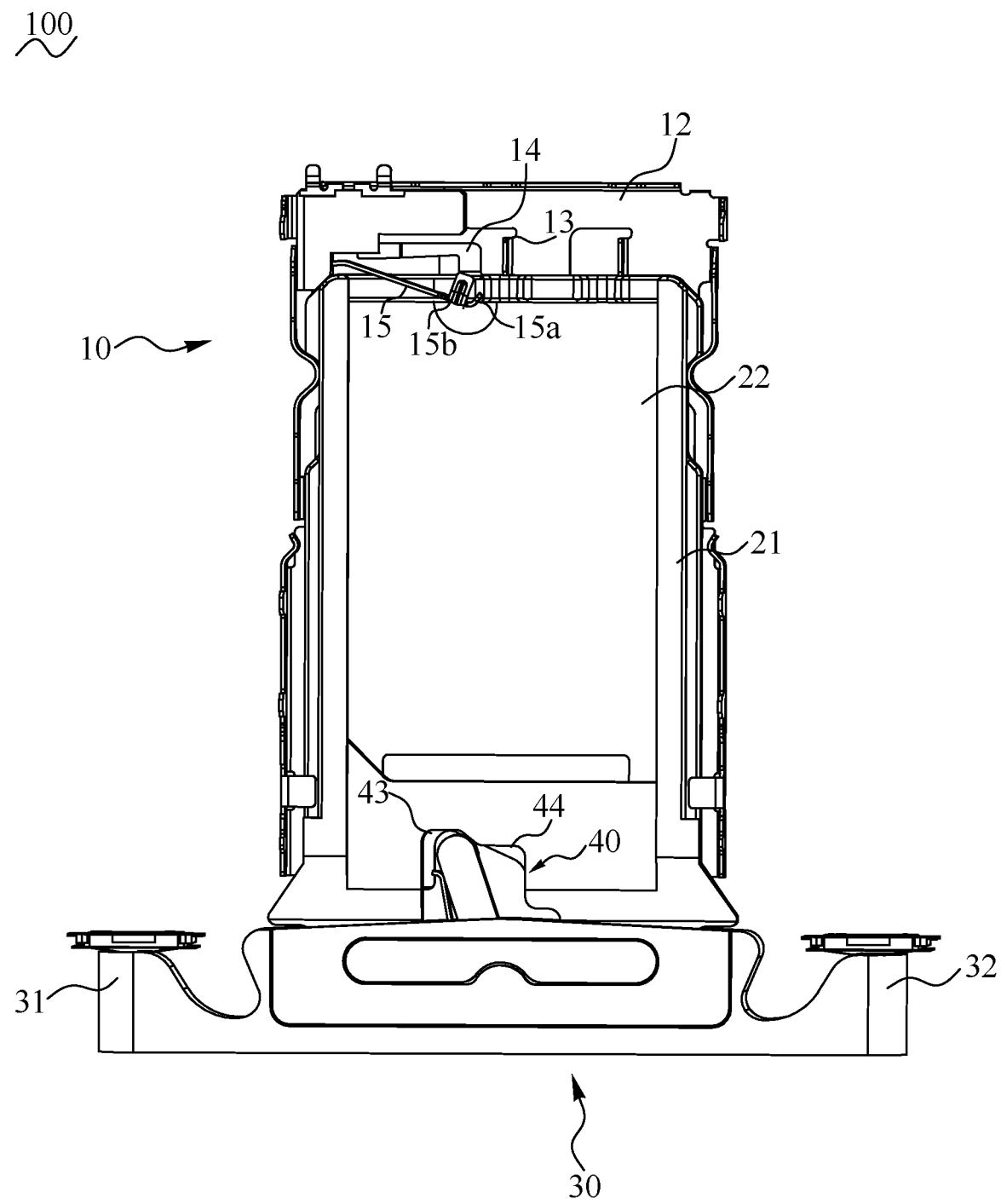
FIG. 2 is a back view of the card holder for receiving the SIM card therein of FIG. 1.
Figure 3:
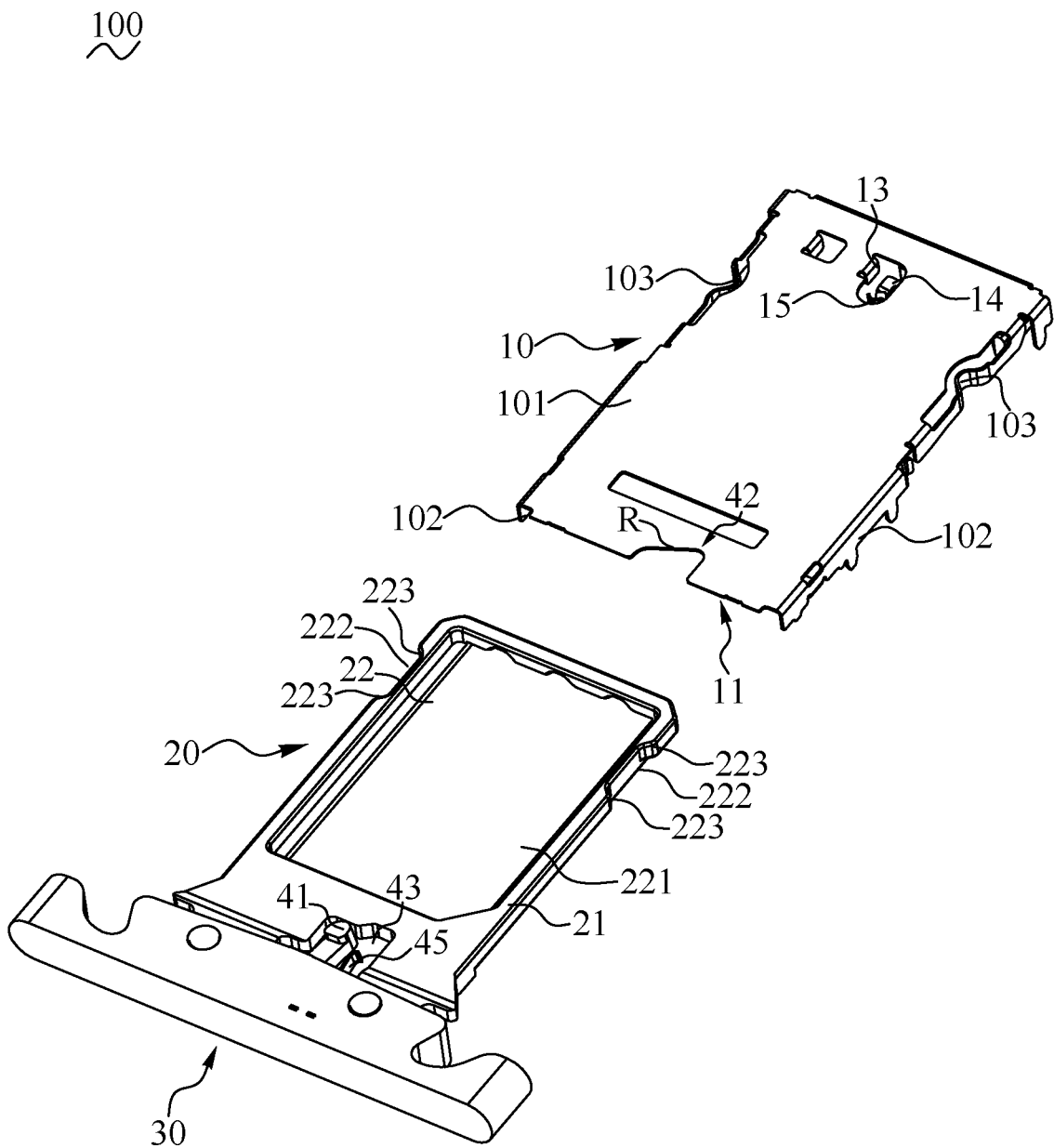
FIG. 3 is a partially exploded perspective view showing that a shell is separated from a base unit of the card holder of FIG. 1.
Figure 4:
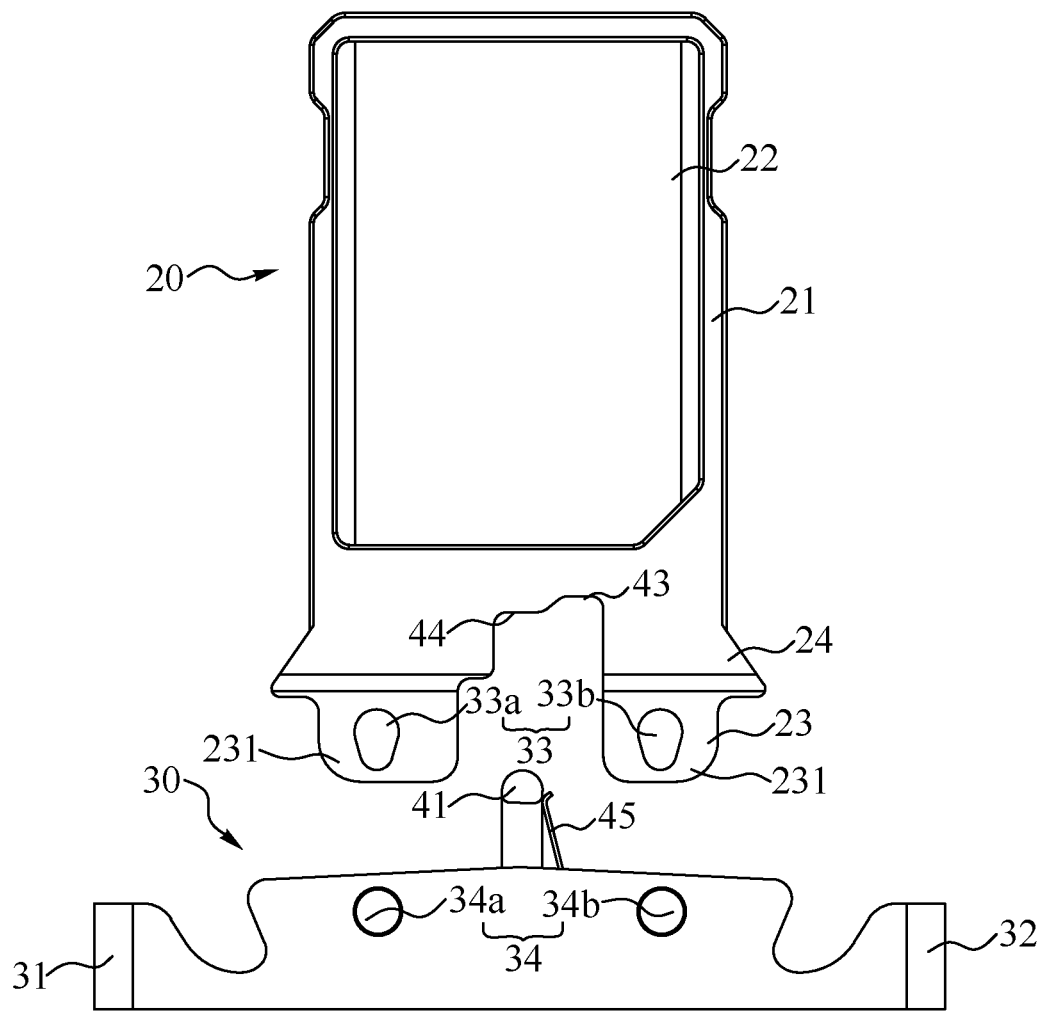
FIG. 4 is an exploded diagrammatic drawing showing that the base unit and a button unit of the card holder in accordance with the present invention being separated from each other.
Figure 5:
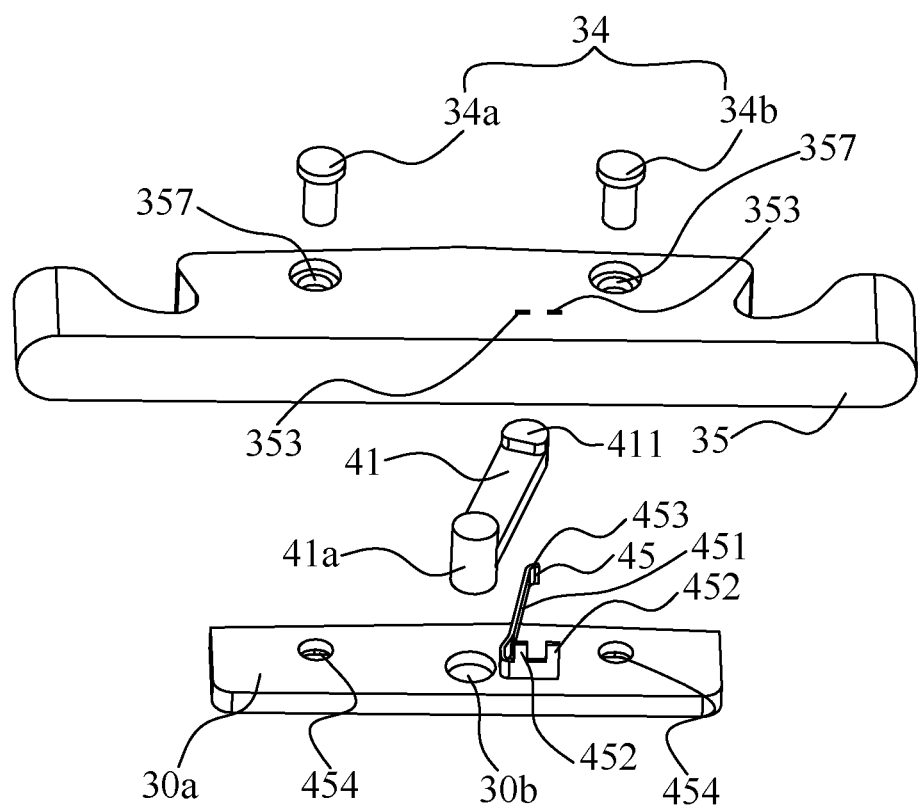
FIG. 5 is an exploded diagrammatic drawing of the button unit of the card holder of FIG. 4.
Figure 6:
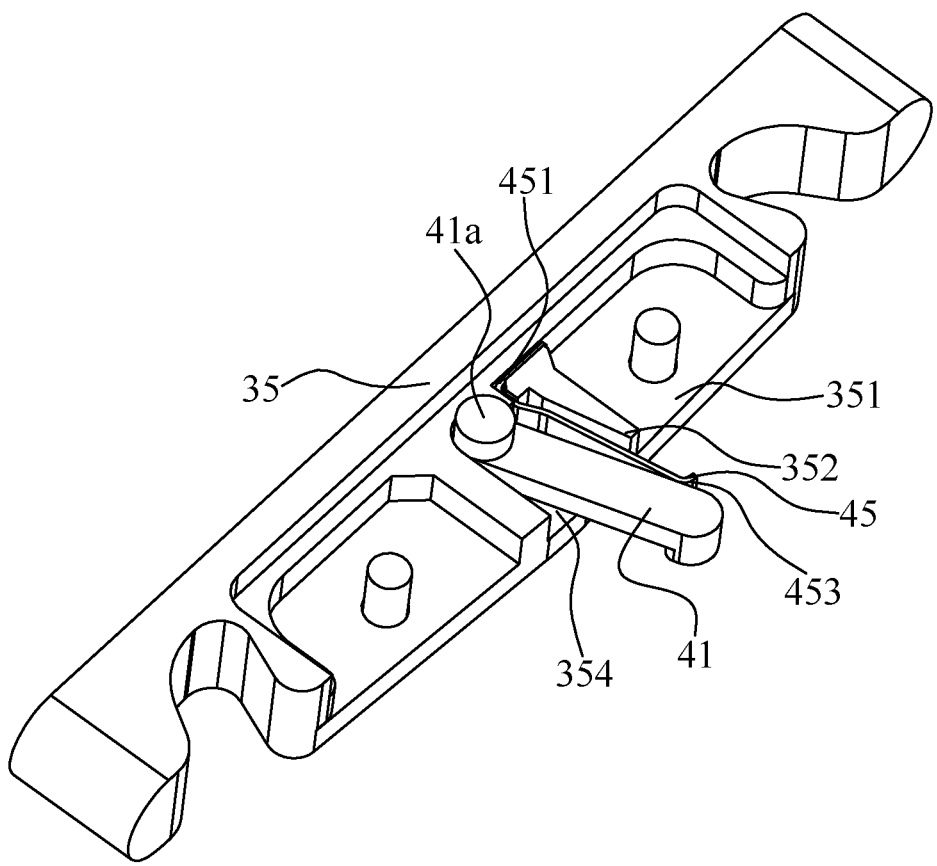
FIG. 6 is a partially assembling perspective view showing that the pushing unit is assembled to a pushing portion of the button unit.
Figure 7:
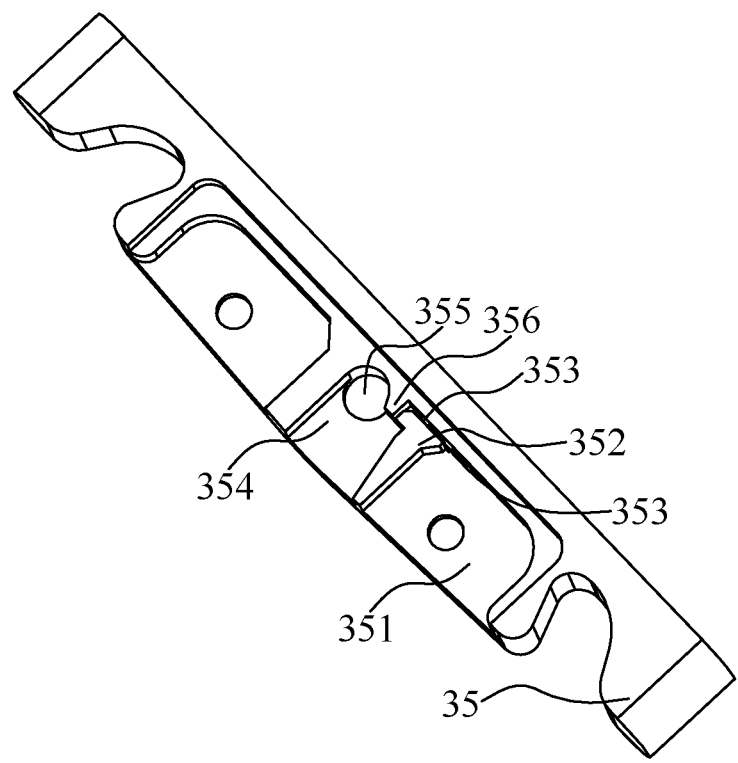
FIG. 7 is a perspective view of the pushing portion of the button unit of FIG. 6.

Referring to FIG. 2, FIG. 3 and FIG. 8, in order to avoid the insertion end 21 of the base unit 20 being overly pushed to exceed the preset position disposed in the button unit 30, so that the SIM card 22a is deviated from the card holder 100. In the preferred embodiment, a front end of the shell 10 opens at least one restricting groove 13 vertically penetrating through a top of the shell 10 and communicated with the accommodating space 12. The card holder 100 further includes a first detecting terminal 14 and a second detecting terminal 15. The first detecting terminal 14 is of a lying inverted L shape and is disposed in the accommodating space 12. A longer side of the first detecting terminal 14 is fastened in the shell 10, and a shorter side of the first detecting terminal 14 is exposed to the restricting groove 13. The second detecting terminal 15 is disposed in the accommodating space 12. One end of the second detecting terminal 15 is fastened in the shell 10 and the other end of the second detecting terminal 15 is exposed to the restricting groove 13. The other end of the second detecting terminal 15 is bent towards the first detecting terminal 14 to form a first hooking portion 15a. A top of the other end of the second detecting terminal 15 is connected with an arc-shaped touching portion 15b arched upward.

When the base unit 20 fully enters the preset position disposed in the button unit 30, the insertion end 21 of the base unit 20 abuts against the shorter side of the first detecting terminal 14 and the other end of the second detecting terminal 15 exposed to the restricting groove 13 to block the insertion end of the base unit 20 moving into the accommodating space 12. The card holder 100 is electrically connected with the SIM card 22a by virtue of the first detecting terminal 14 and the second detecting terminal 15 being connected with the SIM card 22a. The shorter side of the first detecting terminal 14 contacts with the touching portion 15b to form a loop, and then the card holder 100 and the SIM card 22a are ensured to be connected to play a normal function.

Referring to FIG. 1 to FIG. 13, in the preferred embodiment, in order to make the card holder 100 be used with other button functions, the button unit 30 is movably connected with the pushing end 23. The base unit 20 opens at least one fixing hole 33. The two pushing pieces 231 of the pushing end 23 open a first fixing hole 33a and a second fixing hole 33b corresponding to the two fastening holes 357 and the two locating holes 454, respectively. The card holder 100 includes at least one rivet 34. The card holder 100 includes a first rivet 34a and a second rivet 34b. The at least one rivet 34 is fixed in the at least one fastening hole 357 and the at least one locating hole 454, and is movably fixed in the at least one fixing hole 33 along a front-to-rear direction. The first rivet 34a is fixed in one fastening hole 357 and one locating hole 454, and is movably fixed in the first fixing hole 33a along the front-to-rear direction. The second rivet 34b is fixed in the other fastening hole 357 and the other locating hole 454, and is movably fixed in the second fixing hole 33b along the front-to-rear direction. When the button unit 30 and the pushing unit 40 are assembled with the base unit 20, the limiting pillar 41 is located between the first fixing hole 33a and the second fixing hole 33b. The first fixing hole 33a and the second fixing hole 33b are of water drop shapes. Widths of the first fixing hole 33a and the second fixing hole 33b are gradually shrunk from front ends of the first fixing hole 33a and the second fixing hole 33b to rear ends of the first fixing hole 33a and the second fixing hole 33b. The front ends of the first fixing hole 33a and the second fixing hole 33b are closer to the insertion end 21 of the base unit 20. Two opposite ends of the pushing portion 35 of the button unit 30 extend oppositely to form a first button 31 and a second button 32 for realizing button functions, respectively.

In a similar way, when the base unit 20 fully enters the preset position disposed in the button unit 30, and the limiting pillar 41 is in the second status of stopping pushing against the base unit 20, middles of the first rivet 34a and the second rivet 34b move to the front ends of the first fixing hole 33a and the second fixing hole 33b, respectively. When the button unit 30 is pulled rearward, the middles of the first rivet 34a and the second rivet 34b move to the rear ends of the first fixing hole 33a and the second fixing hole 33b, respectively. The two locking portions 103 are guided by the guiding surfaces 223 of the two locking grooves 222 to enter or recede from the two locking grooves 222 so as to be locked in or unlocked from the two locking grooves 222, respectively.

Figure 9:
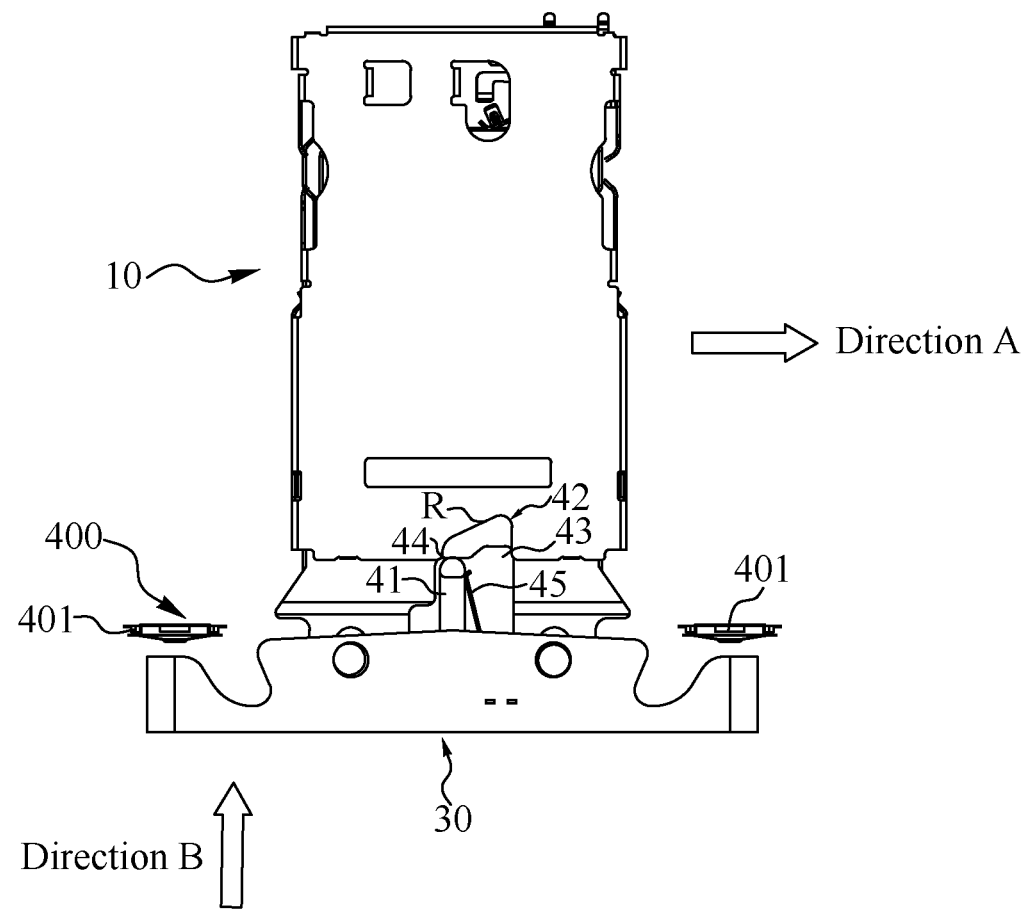
FIG. 9 is a diagrammatic drawing showing that the base unit is partially inserted into the shell of the card holder of FIG. 1.
Figure 10:
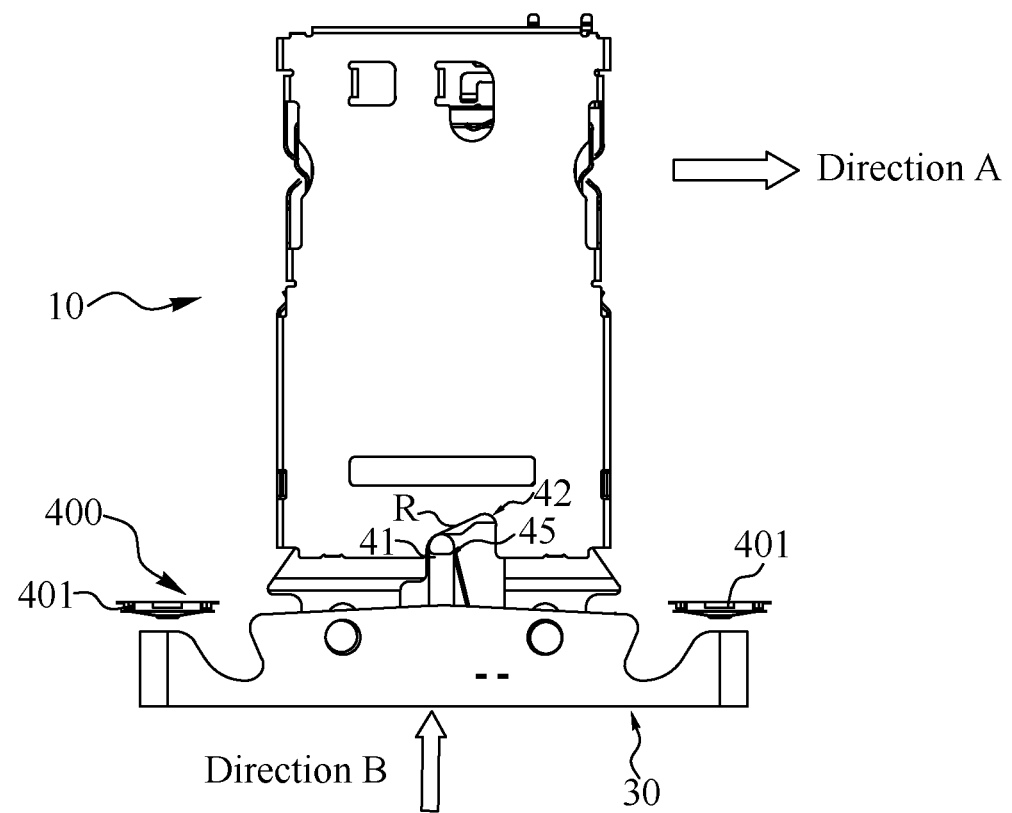
FIG. 10 is a diagrammatic drawing showing that the base unit is fully inserted into the shell of the card holder of FIG. 1.
Figure 11:
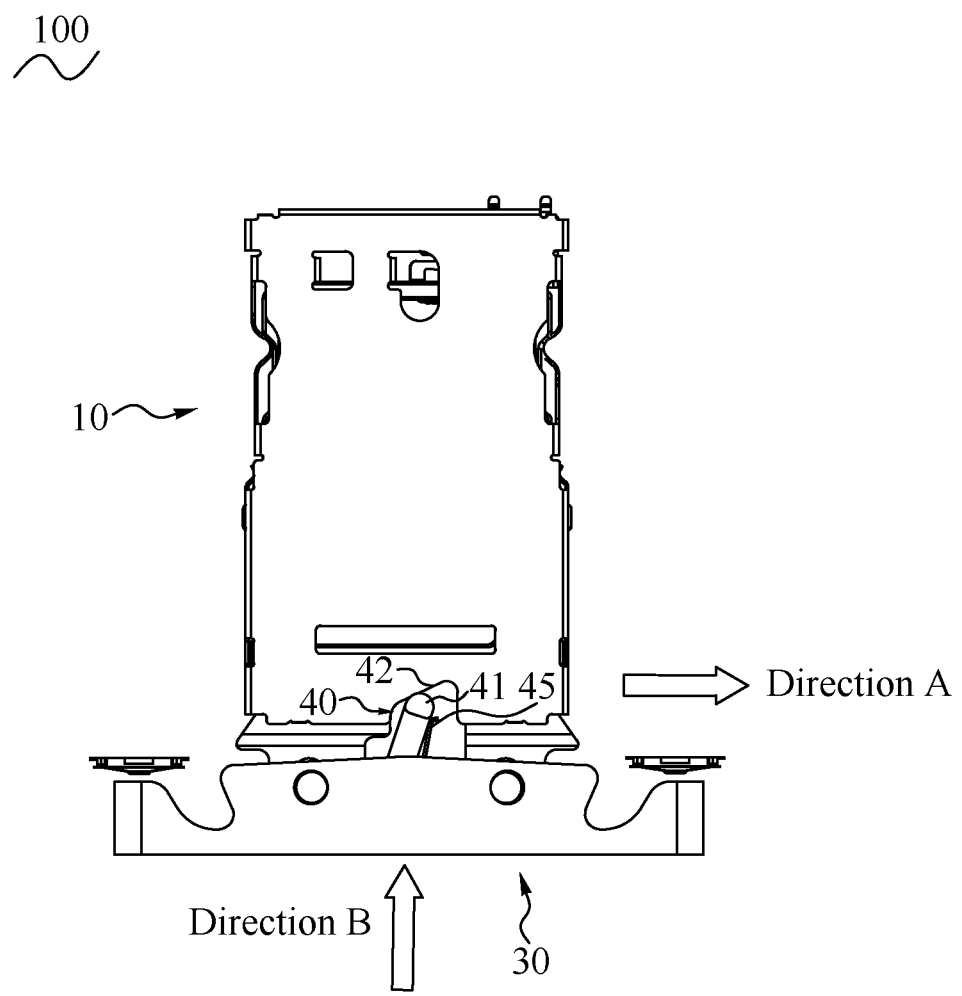
FIG. 11 is a diagrammatic drawing showing that a pushing unit of the card holder is switched from a first status to a second status.
Figure 12:
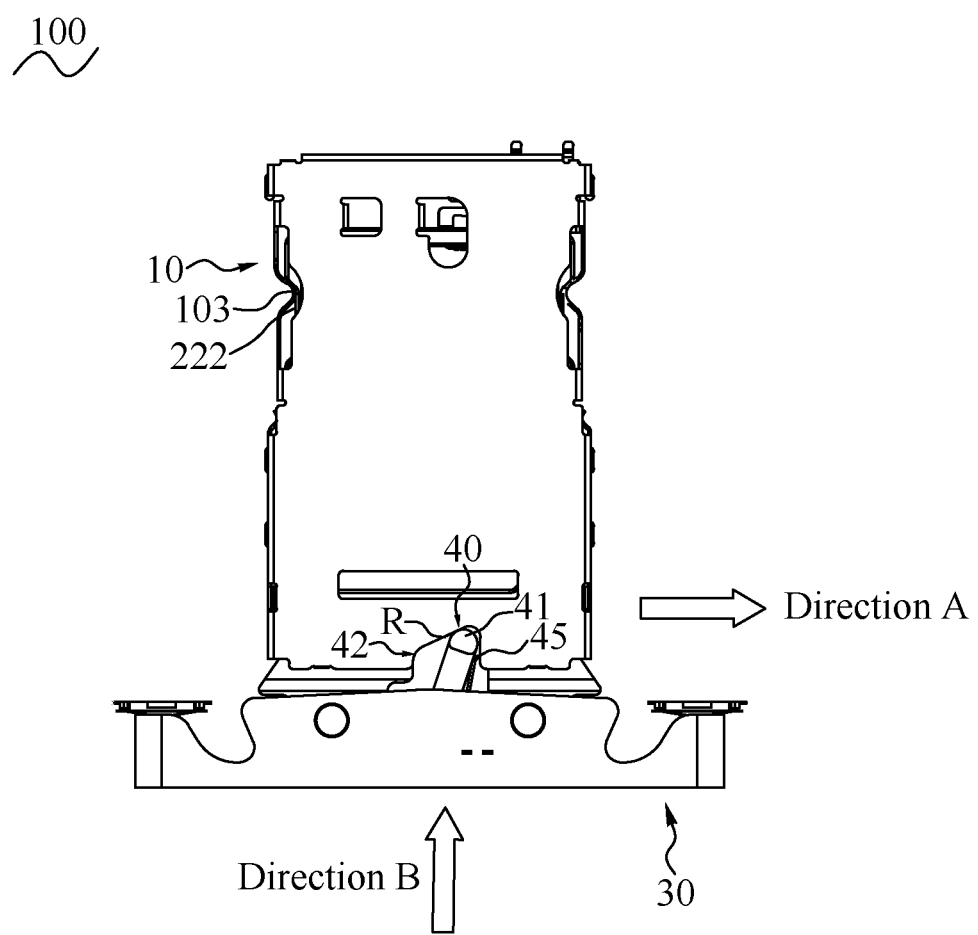
FIG. 12 is a diagrammatic drawing showing that the pushing unit of the card holder is switched to the second status.
Figure 13:
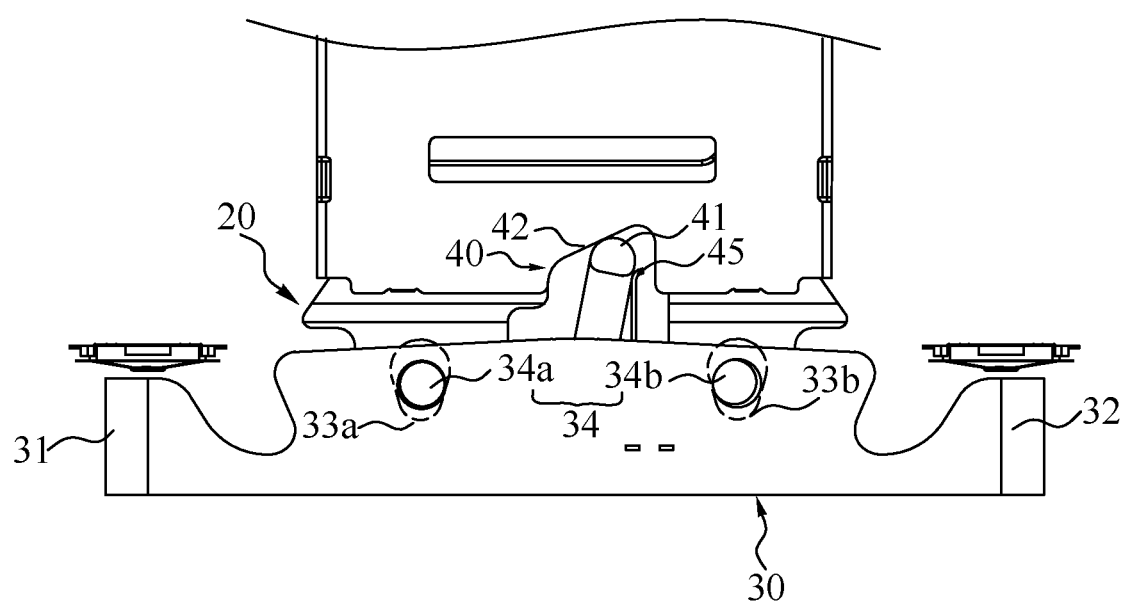
FIG. 13 is a front view showing a static status of the card holder in accordance with the present invention.
Figure 14:
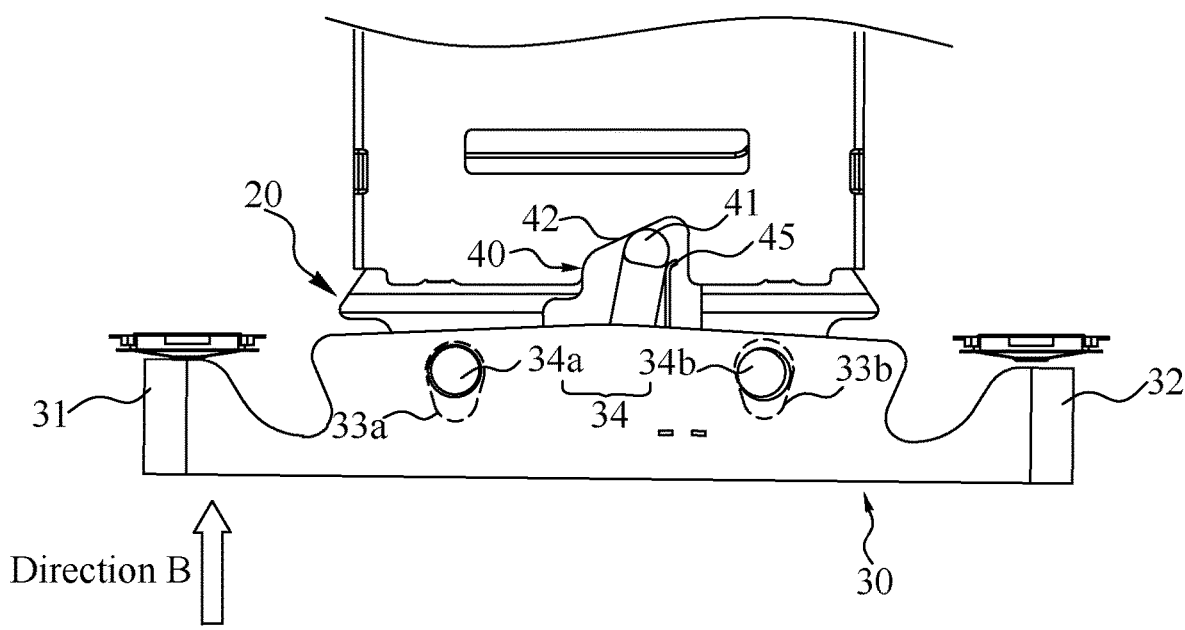
FIG. 14 is a front view showing a status of pressing a first button of the card holder in accordance with the present invention.
Figure 15:
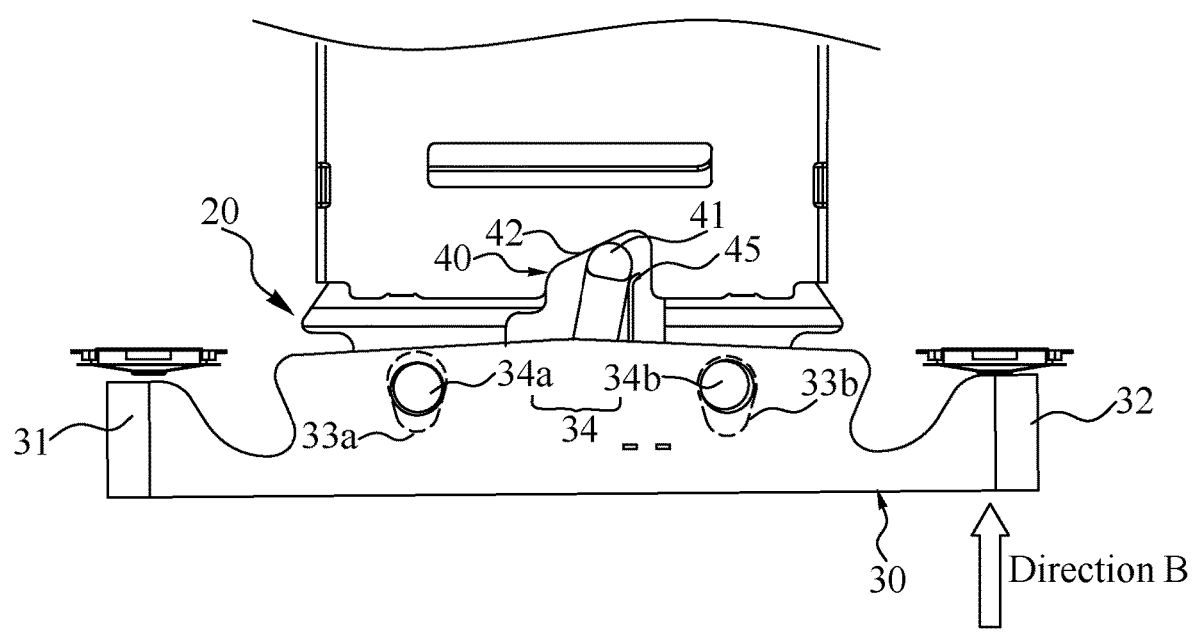
FIG. 15 is a front view showing a status of pressing a second button of the card holder in accordance with the present invention.

Referring to FIG. 9, FIG. 14 and FIG. 15, when the first button 31 is pressed towards the direction B to make a function of the first button 31 be in normal, the first button 31 is connected with one approaching portion 401, the middle of the first rivet 34a moves to the front end of the first fixing hole 33a and is without affecting the second button 32. When the second button 32 is pressed towards the direction B to make a function of the second button 32 be in normal, the second button 32 is connected with the other approaching portion 401, the middle of the second rivet 34b moves to the front end of the second fixing hole 33b and is without affecting the first button 31.

As described above, the card holder 100 is connected with the SIM card 22a by virtue of the pushing unit 40 selectively pushing against the base unit 20, and a function of the button unit 30 is in normal, requirements for the manufacturing tolerances of the card holder 100 are lowered, and functions of the SIM card 22a, the first button 31 and the second button 32 are ensured to be in normal, the first button 31 and the second button 32 are flexibly pressed through a modular design of the at least one fixing hole 33 and the at least one rivet 34, so the functions of the SIM card 22a, the first button 31 and the second button 32 are combined and an occupying space of the card holder 100 in the mobile phone 400 is decreased.

What is claimed is:
1. A card holder for receiving a subscriber identity module (SIM) card, comprising:

a shell opening an opening penetrating through a rear end of the shell, a bottom of the shell being opened freely to form an accommodating space communicated with the opening;

a base unit detachably assembled in the shell, the base unit having an insertion end, a pushing end disposed opposite to the insertion end, and a connecting portion connected between the insertion end and the pushing end, a top of a middle of the insertion end being recessed downward to form a receiving groove for cooperating with the SIM card, the SIM card being received in the receiving groove, the insertion end being detachably inserted into the accommodating space through the opening;

a button unit movably mounted to and connected with the pushing end of the base unit; and a pushing unit disposed between the base unit and the button unit, the pushing unit being capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit.

2. The card holder as claimed in claim 1, wherein the pushing unit includes a limiting pillar pivotally connected with the button unit, and an elastic element disposed to the button unit and contacting with the limiting pillar, a middle of a rear edge of a top plate of the shell is recessed frontward to form an inclined sliding groove communicated with the opening and the accommodating space, inner surfaces of the front wall and two side walls of the inclined sliding groove form a moving track, the limiting pillar is inclined in the inclined sliding groove.

3. The card holder as claimed in claim 2, wherein a middle of a rear surface of the pushing end is recessed frontward to form a lacking groove, one side of a front wall of the lacking groove is recessed frontward to form an avoiding space, a front end of the limiting pillar which is inclined under an action of the inclined sliding groove is accommodated in the avoiding space.

4. The card holder as claimed in claim 2, wherein a middle of a rear surface of the pushing end is recessed frontward to form a lacking groove, one side of a front wall of the lacking groove is recessed frontward to form an avoiding space connected with and communicated with the lacking groove, an inner wall of the lacking groove bears a pushing force of the limiting pillar, one side of the inclined sliding groove adjacent to the lacking groove is shallower, and the other side of the inclined sliding groove adjacent to the avoiding space is deeper.

5. The card holder as claimed in claim 2, wherein one end of the elastic element is fixed in the button unit.

6. The card holder as claimed in claim 2, wherein the inner surface of the front wall of the inclined sliding groove slantwise extends frontward, so one side wall of the inclined sliding groove parallel with two lateral plates of the shell is shorter than the other side wall of the inclined sliding groove which is opposite to the one side wall of the inclined sliding groove.

7. The card holder as claimed in claim 2, wherein a junction between the inner surface of the front wall of the inclined sliding groove and the inner surface of the other side wall of the inclined sliding groove is slantwise arched frontward away from the one side wall of the inclined sliding groove and is shown as an arc shape.

8. The card holder as claimed in claim 1, wherein the button unit includes a pushing portion, and a fastening board covered under the pushing portion, the card holder includes at least one rivet, the base unit opens at least one fixing hole, the fastening board opens at least one locating hole, a top of the pushing portion opens at least one fastening hole, the at least one rivet is fixed in the at least one fastening hole and the at least one locating hole, and is movably fixed in the at least one fixing hole along a front-to-rear direction.

9. The card holder as claimed in claim 1, wherein the button unit includes a pushing portion, and a fastening board covered under the pushing portion, the pushing unit includes a limiting pillar pivotally connected with the button unit, two opposite sides of a top of the pushing portion open two fastening holes, two opposite sides of the fastening board open two locating holes, the pushing end includes two pushing pieces connected with two opposite sides of a rear of the connecting portion, the two pushing pieces open a first fixing hole and a second fixing hole corresponding to the two fastening holes and the two locating holes, respectively, the limiting pillar is located between the first fixing hole and the second fixing hole, the card holder includes a first rivet and a second rivet, the first rivet is fixed in one fastening hole and one locating hole, and is movably fixed in the first fixing hole along the front-to-rear direction, the second rivet is fixed in the other fastening hole and the other locating hole, and is movably fixed in the second fixing hole along the front-to-rear direction.

10. The card holder as claimed in claim 9, wherein the first fixing hole and the second fixing hole are of water drop shapes, widths of the first fixing hole and the second fixing hole are gradually shrunk from front ends of the first fixing hole and the second fixing hole to rear ends of the first fixing hole and the second fixing hole, the front ends of the first fixing hole and the second fixing hole are closer to the insertion end of the base unit.

11. The card holder as claimed in claim 9, wherein the button unit includes a pushing portion, two opposite ends of the pushing portion of the button unit extend oppositely to form a first button and a second button, respectively.

12. The card holder as claimed in claim 1, wherein the shell has a top plate, and two lateral plates protruded downward from two opposite sides of the top plate, fronts of the two lateral plates are arched towards each other to form two locking portions, fronts of two opposite sides of the insertion end are recessed inward to form two locking grooves, the two locking portions are locked in the two locking grooves.

13. The card holder as claimed in claim 12, wherein two facing inner surfaces of each locking groove are oppositely inclined outward to form two guiding surfaces, the two locking portions are guided by the guiding surfaces of the two locking grooves, respectively.

14. The card holder as claimed in claim 1, wherein the button unit includes a pushing portion, and a fastening board covered under the pushing portion, a middle of the fastening board opens a pivoting hole, a middle of a bottom surface of the pushing portion is recessed upward to form a limiting groove, a rear end of an inner surface of a top wall of the limiting groove is further recessed upward to form a rotation groove, the pushing unit includes a limiting pillar pivotally connected with the button unit, a rear end of the limiting pillar is connected with a pivoting column, a top end of the pivoting column is rotatably disposed in the rotation groove, a bottom end of the pivoting column is rotatably limited in the pivoting hole.

15. The card holder as claimed in claim 14, wherein the elastic element has a substantially L-shaped fixing portion, a tail end of the fixing portion is bent sideward to form an abutting portion opposite to a rear end of the fixing portion, one side of the bottom surface of the pushing portion is recessed upward to form a holding groove, the limiting groove is connected with and communicated with the holding groove, an inner surface of a top wall of the holding groove protrudes downward to form a T-shaped buckling block, a portion of a rear wall of the holding groove protrudes frontward to form an isolation block, the elastic element is fastened in the holding groove, the fixing portion is fixed among the buckling block, the isolation block and the rear wall of the holding groove, the abutting portion abuts against a front end of the limiting pillar.

16. The card holder as claimed in claim 15, wherein two portions of a top of a rear end of the fixing portion disposed horizontally protrude upward to form two insertion pieces spaced from each other, two sides of a portion of the top wall of the holding groove between the isolation block and the rear wall of the holding groove open two insertion slots, the two insertion pieces are inserted into the two insertion slots, respectively.

17. The card holder as claimed in claim 14, wherein a top of a front end of the limiting pillar protrudes upward to form a blocking portion, a middle of a rear edge of a top plate of the shell is recessed frontward to form an inclined sliding groove communicated with the opening and the accommodating space, the blocking portion is blocked in the inclined sliding groove.

18. A card holder for receiving a subscriber identity module (SIM) card, comprising:
   a shell opening an opening penetrating through a rear end of the shell, a bottom of the shell being opened freely to form an accommodating space communicated with the opening;
   a base unit detachably assembled in the shell, the base unit having an insertion end, a pushing end disposed opposite to the insertion end, a connecting portion connected between the insertion end and the pushing end, and a receiving groove disposed in the insertion end, the SIM card being received in the receiving groove, the insertion end being detachably inserted into the accommodating space through the opening;
   a button unit movably mounted to the pushing end of the base unit; and
   a pushing unit disposed between the base unit and the button unit, the pushing unit being capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit;
   wherein two opposite ends of the pushing portion extend oppositely to form a first button and a second button for realizing button functions, respectively.

19. A card holder for receiving a subscriber identity module (SIM) card, comprising:
   a shell opening an opening penetrating through a rear end of the shell, a bottom of the shell being opened to form an accommodating space communicated with the opening;
   a base unit detachably assembled in the shell, the base unit having an insertion end, a pushing end disposed opposite to the insertion end, a connecting portion connected between the insertion end and the pushing end, and a receiving groove disposed in the insertion end, the SIM card being received in the receiving groove, the insertion end being detachably inserted into the accommodating space through the opening;
   a button unit movably mounted to the pushing end of the base unit; and
   a pushing unit disposed between the base unit and the button unit, the pushing unit including a limiting pillar pivotally connected with the button unit, and an elastic element disposed to the button unit and contacting with the limiting pillar, a rear edge of a top plate of the shell being recessed frontward to form an inclined sliding groove communicated with the opening and the accommodating space, the limiting pillar being inclined in the inclined sliding groove, the pushing unit being capable of being alternatively in a first status of pushing against the base unit and in a second status of stopping pushing against the base unit, so that the pushing unit is switched from the first status of pushing against the base unit to the second status of stopping pushing against the base unit, on the contrary, the pushing unit is switched from the second status of stopping pushing against the base unit to the first status of pushing against the base unit.

* * * * *